United States Patent Office 3,411,913
Patented Nov. 19, 1968

3,411,913
PLASTICIZED GELATIN COATINGS CONTAINING NORBORNANE DIOLS
Jan W. H. Faber and William F. Fowler, Jr., Rochester, N.Y., assignors to Eastman Kodak Company, Rochester, N.Y., a corporation of New Jersey
No Drawing. Filed Apr. 27, 1965, Ser. No. 451,319
6 Claims. (Cl. 96—94)

ABSTRACT OF THE DISCLOSURE

Gelatin coatings and coating compositions which contain, in an effective amount to plasticize the gelatin, a norbornane compound which contains at least two hydroxy groups.

---

This invention relates to plasticized gelatin coating compositions and plasticized gelatin coatings.

A wide variety of polyols have previously been employed as plasticizers for gelatin. One of the most widely known gelatin plasticizers is glycerin. Milton et al. in U.S. Patent 2,960,404 show that gelatin may be advantageously plasticized with a dihydroxyalkane containing from 4 to 7 carbon atoms. (It should be noted that Milton et al. do not disclose any dihydroxycycloalkyl compounds as gelatin plasticizers.) Glycerin and the dihydroxy compounds of Milton et al. are good plasticizers in many respects; however, when gelatin coatings containing these plasticizers are applied to flexible supports, undesirable curling occurs when the coated support is stored at low relative humidity. It therefore appears highly desirable to provide a plasticized gelatin composition which may be coated on flexible supports, and stored at low relative humidity without curling.

One object of this invention is to provide gelatin coating compositions plasticized with certain novel plasticizers. Another object of this invention is to provide plasticized gelatin coatings which are substantially free from a tendency to curl at low relative humidity. A further object of this invention is to provide gelatin silver halide emulsions containing novel plasticizers for the gelatin. Other objects of this invention will appear herein.

In accordance with this invention, gelatin coatings and coating compositions are provided which contain, in an effective amount to plasticize the gelatin, a norbornane compound which contains at least two hydroxy groups. Gelatin coatings containing the novel plasticizers of the invention are satisfactorily plasticized. Flexible supports coated with the novel plasticized compositions of this invention are substantially free from curl at low as well as at high relative humidities.

An especially useful class of gelatin plasticizers in accordance with this invention have the following formula:

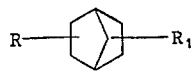

wherein R and R₁ each represents a substitutent selected from the group consisting of hydroxyl, alkoxy substituents, preferably of from 1 to 10 carbon atoms, which contain at least one hydroxyl group, such as 2-hydroxyethoxy, 2- or 3-hydroxypropoxy, 3,4-dihydroxybutoxy and 3,6-dihydroxyhexoxy; and, cycloalkoxy substituents, preferably containing from 4 to 7 carbon atoms, which contain at least one hydroxy group, such as 5-(2-hydroxy)-norbornoxy. Particularly good results are obtained with mixtures of bicyclo [2.2.1] heptane-2,5-diol and bicyclo [2.2.1] heptane-2,6-diol, also referred to herein as 2,5- and 2,6-norbornane diol.

This invention will be further illustrated in the following examples. Example 1 shows various gelatin silver halide emulsions plasticized with the novel plasticizers of this invention.

EXAMPLE 1

The plasticizing action of various norbornane compounds containing at least two hydroxy groups was determined by adding them to a medium-speed silver bromoiodide emulsion which had been panchromatically sensitized with a cyanine dye. Each emulsion sample was coated on a cellulose acetate film support at a coverage of 393 mg. of silver and 722 mg. of gelatin per square foot. The emulsion contained 198 g. of gelatin per mole of silver halide. A sample of each coating was exposed on an Eastman 1B sensitometer, processed for nine minutes in Kodak D–76 Developer, fixed, washed and dried. The plasticizer action of the compounds was determined by subjecting a second sample of each coating to the wedge bending sensitivity test described in Example 2 of U.S. Patent No. 3,033,680. The third sample of each coating was incubated for two weeks at 120° F. and then processed. The results in Tables I and II were obtained, and it can be seen that the compounds described act as both plasticizers and antifoggants.

TABLE I

| Diol, g./Ag mole | Fresh | | | Incubation Tests | | | Wedge Bending Sensitivity [1] |
|---|---|---|---|---|---|---|---|
| | Relative Speed | γ | Fog | Relative Speed | γ | Fog | |
| | 100 | .92 | .08 | 83 | .80 | .10 | Medium. |
| 15 | 107 | .88 | .03 | 81 | .77 | .06 | Very slight. |
| 32 | 112 | .90 | .01 | 100 | .76 | .04 | Do. |
| 32 | 105 | .86 | .01 | 94 | .76 | .04 | Do. |

[1] 70° F., 50% RH; wedge opening, 0.150″.

In the above table, diol refers to a mixture of 2,5- and 2,6-norbornanediol.

TABLE II

| Compound Added, g./mole Ag | Fresh | | | 1 wk. 120° F. | | | Wedge Bending Sensitivity |
|---|---|---|---|---|---|---|---|
| | Relative Speed | γ | Fog | Relative Speed | γ | Fog | |
| Control | 100 | .85 | .08 | 87 | .73 | .06 | Great. |
| 20 g. Compound I | 123 | .89 | .03 | 95 | .76 | .02 | Slight. |
| 30 g. Compound I | 115 | .83 | .02 | 102 | .73 | .01 | Do. |
| Control | 100 | .82 | .05 | 91 | .71 | .07 | Medium. |
| 10 g. Compound II | 105 | .79 | .03 | 91 | .73 | .05 | Slight. |
| 20 g. Compound II | 105 | .80 | .03 | 94 | .69 | .04 | Do. |
| 30 g. Compound II | 112 | .78 | .01 | 87 | .64 | .04 | Very slight. |

In the above table, Compound I refers to a mixture of 2,5-, and 2,6-bis (2-hydroxyethoxy) norbornane and Compound II refers to a mixture of 2,5- or 2,6-bis (2,3-dihydroxypropoxy) norbornane.

The substantial reduction in curl at low humidity of gelatin compositions in accordance with this invention is demonstrated in Example 2.

EXAMPLE 2

The samples of the coated emulsions prepared in Example 1 were held at a relative humidity of 20% and a temperature of 70° F. for one week. The elements were substantially free from curl. When the same emulsions were prepared except that glycerin, 1,4-butanediol and 1,6-hexanediol each were substituted for the plasticizers of this invention and coated on separate supports, it was found that the elements exhibited substantial curl upon holding for one week at 20% RH and 70° F.

The novel gelatin plasticizers of this invention has several important advantages over dihydroxy alkane plasticizers. First, the present novel plasticizers result in coatings which have less tack than gelatin coatings containing dihydroxy alkane plasticizers at equal concentrations. Second, photographic gelatin coatings containing the novel plasticizers of the invention have more effective wetting ability than corresponding coatings plasticized with a dihydroxy alkane. This is important in photography since if the photographic coating has poor wetting properties, which occurs when dihydroxy alkanes are used to plasticize, developer will drain off the coating unevenly causing undesirable differences in density in the developed material. In addition, the subject novel plasticizers have a greater anti-foggant effect on emulsions in which they are incorporated than dihydroxy alkanes.

The hydroxy substituted norbornane compounds employed in this invention may be advantageously prepared by reacting bicyclo[2.2.1] heptadiene or bicyclo[2.2.1] hept-5-en-2-ol acetate with water, a diol or a fatty acid such as acetic acid and, as catalyst, a strong acid such as sulfuric acid or an acidic ion exchange resin. When the reactant is a fatty acid, an ester is produced and the diol is readily prepared by hydrolyzing the ester group in any suitable manner, such as with hydrochloric acid. A method for preparing these compounds is described in Faber and Fowler U.S. patent application Ser. No. 451,302 filed Apr. 27, 1965.

The plasticizers of this invention are effective over a relatively wide concentration range, 5–25% of the plasticizer, based on the weight of the gelatin, giving especially good results.

The novel plasticized gelatin compositions of this invention, as shown in the examples, are highly useful carriers for photographic silver halide grains. These plasticized gelatin compositions also have utility in photographic elements other than as a carrier for silver halide, such as interlayers in color materials, and as filter layers in both color and black-and-white photographic elements. Gelatin coatings plasticized in accordance with this invention may also be employed as photographic stripping layers with good results.

Gelatin silver halide emulsions plasticized with the compounds of this invention may contain chemical and spectral sensitizers, stabilizers, speed increasing compounds, and gelatin hardeners such as those described and referred to in U.S. Patent 3,039,873 columns 10–12.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A gelatin coating composition containing, in a quantity sufficient to effectively plasticize the gelatin, a norbornane compound which contains at least two hydroxy groups.

2. A photographic element comprising a flexible support having coated thereon a gelatin silver halide emulsion containing, in a quantity sufficient to effectively plasticize the gelatin, a norbornane compound containing at least two hydroxy groups.

3. A gelatin coating composition containing, in a quantity sufficient to effectively plasticize the gelatin, a norbornane compound having the following formula:

wherein R and $R_1$ each are selected from the group consisting of hydroxyl; alkoxy substituents containing from 1 to 10 carbon atoms, said alkoxy substituents containing at least one hydroxyl group; and, cycloakoxy substituents which contain at least one hydroxyl group.

4. A photographic element comprising a flexible support having coated thereon a gelatin silver halide emulsion containing, in a quantity sufficient to effectively plasticize the gelatin, a norbornane compound having the following formula:

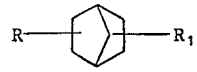

wherein R and $R_1$ each are selected from the group consisting of hydroxyl; alkoxy substituents containing from 1 to 10 carbon atoms, said alkoxy substituents containing at least one hydroxyl group; and, cycloalkoxy substituents which contain at least one hydroxyl group.

5. A gelatin coating composition containing, in a quantity sufficient to plasticize the gelatin, a mixture of bicyclo [2.2.1] heptane-2,5-diol and bicyyclo[2.2.1] heptane-2,6-diol.

6. A gelatin photographic silver halide emulsion containing, in a quantity sufficient to plasticize the gelatin, a mixture of bicyclo[2.2.1] heptane-2,5-diol and bicyclo [2.2.1] heptane-2,6-diol.

References Cited

UNITED STATES PATENTS

| | | | |
|---|---|---|---|
| 2,960,404 | 11/1960 | Milton et al. | 96—94 |
| 3,042,524 | 7/1962 | Albus et al. | 96—94 |
| 3,326,685 | 6/1967 | Abbott et al. | 96—62 |

J. TRAVIS BROWN, *Primary Examiner.*